(12) United States Patent
Hicklin et al.

(10) Patent No.: US 12,222,988 B2
(45) Date of Patent: *Feb. 11, 2025

(54) MACHINE-LEARNING SYSTEM FOR SERVICING QUERIES FOR DIGITAL CONTENT

(71) Applicant: EQUIFAX INC., Atlanta, GA (US)

(72) Inventors: Steven Hicklin, York (GB); Noushin Rezapour Asheghi, Atlanta, GA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,790

(22) Filed: Jul. 26, 2023

(65) Prior Publication Data

US 2023/0367821 A1    Nov. 16, 2023

Related U.S. Application Data

(63) Continuation of application No. 16/623,724, filed as application No. PCT/US2018/038038 on Jun. 18, 2018, now Pat. No. 11,748,416.

(60) Provisional application No. 62/521,825, filed on Jun. 19, 2017.

(51) Int. Cl.
    *G06F 16/903*   (2019.01)
    *G06F 16/9035*  (2019.01)
    *G06F 16/906*   (2019.01)
    *G06F 40/30*    (2020.01)
    *G06N 20/00*    (2019.01)

(52) U.S. Cl.
    CPC .... *G06F 16/90344* (2019.01); *G06F 16/9035* (2019.01); *G06F 16/906* (2019.01); *G06F 40/30* (2020.01); *G06N 20/00* (2019.01)

(58) Field of Classification Search
    CPC .......... G06F 16/90344; G06F 16/9035; G06F 16/906
    See application file for complete search history.

(56) References Cited

U.S. PATENT DOCUMENTS

| 5,649,193  | A  | 7/1997  | Sumita et al. |
| 6,801,906  | B1 | 10/2004 | Bates et al. |
| 6,978,419  | B1 | 12/2005 | Kantrowitz |
| 7,809,695  | B2 | 10/2010 | Conrad et al. |

(Continued)

OTHER PUBLICATIONS

Canadian Application No. CA3,067,326, Office Action, Mailed On Oct. 12, 2023, 6 pages.

(Continued)

*Primary Examiner* — William Spieler
(74) *Attorney, Agent, or Firm* — Kilpatrick Townsend & Stockton LLP

(57) ABSTRACT

In some aspects, a content-extraction system can receive a query from a client device and generate a result set of digital content responsive to the query. For instance, the content-extraction system can obtain, from a search system, a set of digital content matching one or more keywords. The content-extraction system can exclude digital content items lacking core content, digital content items with duplicative content, or both. In some aspects, the content-extraction system can determine, for one or more remaining digital content items, a content attribute score. The content-extraction system can select, as the result set of digital content, a subset of digital content based on the content attribute scores. The content-extraction system can output the result set to the client device.

20 Claims, 5 Drawing Sheets

(56) References Cited

U.S. PATENT DOCUMENTS

| | | |
|---|---|---|
| 7,895,225 B1 | 2/2011 | Thirumalai et al. |
| 7,945,600 B1 | 5/2011 | Thomas et al. |
| 8,447,722 B1 | 5/2013 | Ahuja et al. |
| 9,009,162 B1 | 4/2015 | Luo |
| 9,026,516 B1 | 5/2015 | Chapin et al. |
| 9,916,383 B1 | 3/2018 | Ching |
| 11,748,416 B2 | 9/2023 | Hicklin et al. |
| 2002/0099700 A1 | 7/2002 | Li |
| 2005/0027631 A1 | 2/2005 | McAtee |
| 2005/0060311 A1 | 3/2005 | Tong et al. |
| 2007/0276829 A1 | 11/2007 | Wang et al. |
| 2008/0010276 A1 | 1/2008 | Morton et al. |
| 2008/0215546 A1 | 9/2008 | Baum et al. |
| 2008/0263023 A1 | 10/2008 | Vailaya et al. |
| 2008/0263032 A1 | 10/2008 | Vailaya et al. |
| 2008/0263033 A1 | 10/2008 | Vailaya et al. |
| 2010/0082570 A1 | 4/2010 | Altaf et al. |
| 2010/0114899 A1 | 5/2010 | Guha et al. |
| 2010/0287033 A1 | 11/2010 | Mathur |
| 2011/0178995 A1 | 7/2011 | Suchter et al. |
| 2011/0202522 A1 | 8/2011 | Ciemiewicz et al. |
| 2012/0005200 A1 | 1/2012 | Lawrence |
| 2012/0197934 A1 | 8/2012 | Zhang et al. |
| 2013/0024448 A1 | 1/2013 | Herbrich et al. |
| 2013/0254209 A1 | 9/2013 | Kang |
| 2014/0136509 A1 | 5/2014 | Kritt et al. |
| 2014/0201154 A1 | 7/2014 | Varadharajan et al. |
| 2014/0201203 A1 | 7/2014 | Krishna et al. |
| 2014/0222791 A1 | 8/2014 | Childress et al. |
| 2015/0058344 A1 | 2/2015 | Bhatia et al. |
| 2015/0088894 A1 | 3/2015 | Czarlinska et al. |
| 2015/0154660 A1 | 6/2015 | Weald et al. |
| 2016/0004703 A1 | 1/2016 | Angaluri et al. |
| 2016/0342591 A1 | 11/2016 | Zholudev et al. |
| 2016/0364608 A1 | 12/2016 | Sengupta et al. |
| 2017/0017724 A1 | 1/2017 | Macgillivray et al. |
| 2017/0075538 A1 | 3/2017 | Park et al. |
| 2017/0139814 A1 | 5/2017 | Chau et al. |
| 2017/0139939 A1 | 5/2017 | Rougier |
| 2017/0220650 A1 | 8/2017 | Tsai |
| 2017/0344636 A1 | 11/2017 | Barajas Gonzalez et al. |
| 2018/0018564 A1 | 1/2018 | Erenrich et al. |
| 2018/0114060 A1 | 4/2018 | Lozano et al. |
| 2018/0203915 A1 | 7/2018 | Marshall et al. |
| 2021/0081499 A1 | 3/2021 | Rakshit et al. |

OTHER PUBLICATIONS

European Application No. EP18821512.3, Office Action, Mailed On Jan. 25, 2024, 6 pages.
U.S. Appl. No. 16/623,724, Final Office Action mailed on May 23, 2022, 13 pages.
U.S. Appl. No. 16/623,724, Non-Final Office Action mailed on Oct. 5, 2022, 12 pages.
U.S. Appl. No. 16/623,724, Non-Final Office Action mailed on Nov. 9, 2021, 22 pages.
U.S. Appl. No. 16/623,724, Notice of Allowance mailed on Apr. 21, 2023, 8 pages.
European Application No. 18821512.3, Extended European Search Report mailed on Feb. 3, 2021, 11 pages.
International Application No. PCT/US2018/038038, International Preliminary Report on Patentability mailed on Jan. 2, 2020, 9 pages.
International Application No. PCT/US2018/038038, International Search Report and Written Opinion mailed on Oct. 8, 2018, 13 pages.

MACHINE-LEARNING SYSTEM FOR SERVICING QUERIES FOR DIGITAL CONTENT

CROSS-REFERENCES TO RELATED APPLICATIONS

This application is a continuation of and claims priority to U.S. patent application Ser. No. 16/623,724, filed Dec. 17, 2019, which is a national stage application, filed under 35 U.S.C. § 371, of International Patent Application No. PCT/US2018/038038, filed Jun. 18, 2018, which claims the benefit of U.S. Provisional Application No. 62/251,825, filed Jun. 19, 2017, each of which is incorporated by reference herein in their entirety.

TECHNICAL FIELD

This disclosure generally relates to artificial intelligence and machine learning, and more particularly relates to improving query performance by using a machine-learning filtering system for servicing a query by extracting relevant digital content from a set of digital content.

BACKGROUND

Search engines, analytical systems, and other online services are used to retrieve digital content, such as digital content items, from a wide range of online data sources. Search engines search a network (e.g., the Internet) for keywords in digital content items uploaded by various servers and computing devices. A search engine can perform a search for news articles and other media that associate an entity (e.g., a company or an individual) with a set of actions or behaviors (e.g., fraud or bankruptcy). The search engine can return thousands of digital content items, including false positives. False positives can include digital content items that use a different definition of the keyword or use the keyword unrelated to the entity. In one example, the search engine can perform a search for press coverage about fraud linked to an entity that provides fraud detection products. The search engine can retrieve digital content items that discuss fraud products offered by the entity and are unrelated to fraud committed by the entity.

SUMMARY

In some aspects, a content-extraction system can receive a query from a client device and generate a result set of digital content that is responsive to the query. For instance, the content-extraction system can obtain, from a search system, a set of digital content matching one or more keywords. The content-extraction system can exclude digital content items lacking core content, digital content items with duplicative content, or both. In some aspects, the content-extraction system can determine, for one or more remaining digital content items, a content attribute score. The content-extraction system can select, as the result set of digital content, a subset of digital content based on the content attribute scores. The content-extraction system can output the result set to the client device.

BRIEF DESCRIPTION OF THE DRAWINGS

Aspects of the present disclosure can be better understood with reference to the following diagrams. The drawings are not necessarily to scale, with emphasis instead being placed upon clearly illustrating certain features of the disclosure.

DETAILED DESCRIPTION

Figure 1:
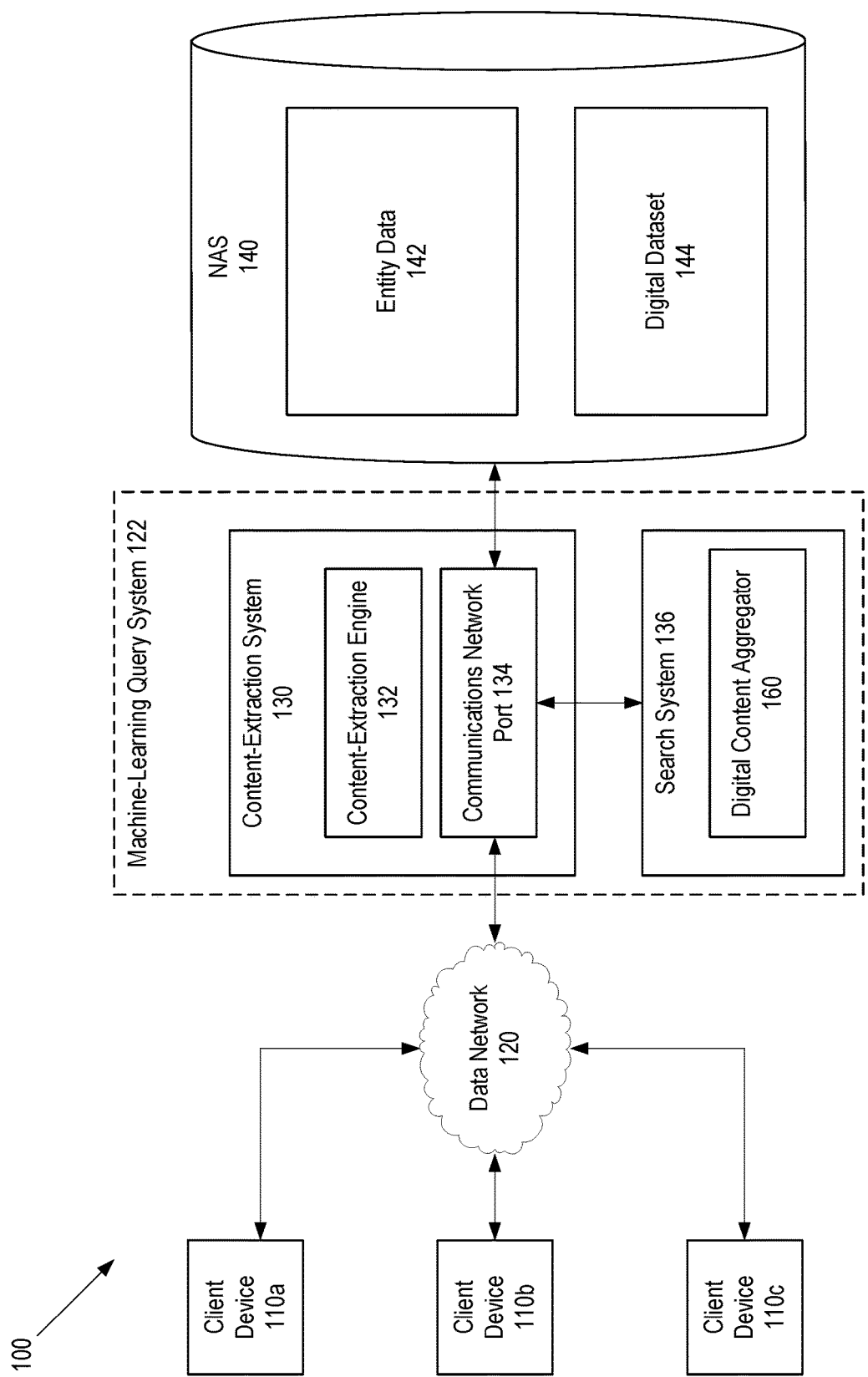
FIG. 1 depicts an example of a computing environment for extracting a result set of digital content from a larger set of digital content items, according to some aspects of the present disclosure.

Existing systems can inaccurately or inefficiently service queries to a remote data source. For instance, to query a data source for relevant search results that might have indicate adverse sentiments toward a particular entity, existing solutions require either submitting a broadly worded, keyword-based query to a search engine and using client-based software to filter out irrelevant data. These existing solutions therefore require extensive computing resources on a client side for eliminating irrelevant, redundant, or otherwise unwanted results.

Certain aspects of this disclosure relate to a machine-learning query system for identifying a subset of digital content items. For instance, the machine-learning query system can service one or more queries for digital content items by extracting a result set of digital content, from the digital content items returned by a keyword query to a search engine. The result set of digital content can be extracted by filtering unwanted content, such as duplicative content, false positives, or content items lacking a specified sentiment.

Some examples of these aspects can overcome one or more of the issues identified above by allowing a query from a client device to be used for retrieving a reduced set of digital content item results without significant loss in accuracy of query results or other query-servicing performance. For instance, a machine-learning query system can be positioned remote from a client device and between the client device and a search system. The machine-learning query system can use one or more features specified by the client device (e.g., weights on certain core content attributes, duplicate content thresholds, etc.) to automatically extract relevant digital content items before transmitting search results to the client device. In some aspects, the machine-learning query system can further limit the search results to digital content items having a positive sentiment or a negative sentiment. Thus, certain aspects involve a combination of devices (e.g., the query system positioned between the client device and search system) that can, compared to existing systems, reduce the computing resources required at a client device for extracting a desired subset of digital content items, reduce the network resources for transmitting the search results to the client device, or some combination thereof. Thus, certain aspects described herein can improve search performance in data-processing systems by performing automated filtering operations remotely from a client device in a manner that is customized based on inputs received from the client device.

The following example is provided to introduce certain aspects. In this example, an online computing system can receive one or more queries for certain types of digital content, such as digital content items that mention a particular entity and have adverse sentiments or other negative sentiments. The online computing system services the query by extracting a query parameter, such as a keyword. The online computing system retrieves a set of digital content items by providing the keyword to a search engine. The online computing system applies the machine-learning filter to exclude, from the retrieved set of digital content items, extraneous results. One example of an extraneous result is a digital content item that lacks a threshold amount of core content. The machine-learning filter can be trained to identify core content of interest. Applying the machine-learning filter to a retrieved set of digital content items can allow the online computing system to determine that the extraneous result lacks the core content. Another example of an extraneous result is a digital content item that includes a threshold amount of duplicative content. The machine-learning filter can be trained to identify duplicative content. Applying the machine-learning filter to a retrieved set of digital content items can allow the online computing system to determine that the extraneous result include the duplicative content. In some aspects, the machine-learning filter can also apply a sentiment analysis to core, non-duplicative digital content and thereby identify which of the digital content items have a certain sentiment (e.g., a positive or negative sentiment) meriting further action.

In these or other examples, the online computing system uses the machine-learning filter to extract a result set of digital content items from the retrieved set of digital content items. The result set of digital content items can have a smaller amount of data than the retrieved set of digital content items due to the exclusion of digital content items with a lack of core content, digital content items with duplicative content, digital content items with irrelevant sentiments, or some combination thereof. Because the result set of digital content items has been generated using various one or more machine-learning filters described herein, the query be serviced with the same performance level (i.e., returning the relevant results) while decreasing processing resources, network bandwidth, or other computing resources that may be required if the original set of keyword-based results was returned in response to the query.

In some aspects, certain aspects provide improvements in query processing by automatically applying various rules of a particular type (e.g., various functions captured in one or more machine learning models) to extract relevant content from keyword based search results. In one example, using one or more models described herein can allow for a more accurate detection of digital content items having a desired amount of core content, a lower amount of duplicate content, or some combination thereof. Thus, the aspects described herein provide improvements to computing systems that detect relevant search results responsive to a digital content item query.

The features discussed herein are not limited to any particular hardware architecture or configuration. A computing device can include any suitable arrangement of components that provide a result conditioned on one or more inputs. Suitable computing devices include multipurpose, microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 depicts an example of a computing environment 100 that can extract a result set of digital content, such as digital documents, from a larger set of digital content items. The computing environment 100 can be a specialized computing environment that may be used for processing large amounts of data using a large number of computer processing cycles. The computing environment 100 may include client devices 110a-c, a data network 120, a machine-learning query system 122 and one or more network-attached data stores ("NAS") 140. In some aspects, the machine-learning query system 122 can include a content-extraction system 130 and a search system 136.

The machine-learning query system 122 can service document queries or other searches from one or more client devices 110a-c. Examples of the machine-learning query system 122 include a server or group of servers configured in a distributed computing system (e.g., a grid, a cloud, etc.). The client devices 110a-c can each be associated with a user or an online service seeking digital documents (e.g., news articles, blogs, social media posts, and videos) associated with an entity (e.g., a company).

The client devices 110a-c can be communicatively coupled to the content-extraction system 130 by the data network 120. In some aspects, the client devices 110a-c can include user devices (e.g., mobile phones, laptops, or desktops), network computers, or other devices that may transmit or otherwise provide a request for digital documents from the content-extraction system 130. In some aspects, the request can be for digital documents indicating adverse press coverage associated with an entity. The client devices 110a-c can indicate types of press that the user has determined to be adverse by transmitting a set of words associated with adverse activities (e.g., fraud or murder) or objects (e.g., drugs or weapons) to the content-extraction system 130.

The content-extraction system 130 may be a specialized computer or other machine that processes the data received within the computing environment 100. The content-extraction system 130 can include one or more processing devices that execute program code, which can include a content-extraction engine 132 stored on a non-transitory computer-readable medium. The content-extraction engine 132 can be executed to identify a subset of a set of digital documents. The subset of digital documents can require less storage space and be manually reviewed faster than the set of digital documents. The content-extraction system 130 can also include a communications network port 134 for communicatively coupling the content-extraction system 130 to other components and networks in the computing environment 100.

The content-extraction system 130 can be communicatively coupled to the NAS 140. The NAS 140 can include memory devices for storing entity data 142 and digital dataset 144 provided to the content-extraction system by one or more components of the computing environment 100. The entity data 142 can include information about an entity. The information can include alternate names of the entity, year the entity was founded, names of members of a board of directors of the entity, an address of the entity, and any other identifiable information about the entity. In some aspects, the entity data 142 is stored in the NAS 140 by the content-extraction system 130. In additional or alternative aspects, the entity data 142 is stored in the NAS 140 by another system and accessible by the content-extraction system 130.

The digital dataset 144 can include digital content obtained from a search for digital documents associated with an entity. The digital dataset 144 can include a set of digital documents that are received by the content-extraction system 130 from a digital content aggregator 160. The digital content aggregator 160 can include a search engine that can perform a search for digital content based on keywords. In some aspects, the content-extraction system 130 can provide the digital content aggregator 160 with keywords based on the entity data 142 and user preferences (e.g., a set of words received from one of the client devices 110*a-c* indicating types of press determined to be adverse by the user). The content-extraction system 130 can receive digital documents associated with the entity from the digital content aggregator 160 and store the digital documents in the NAS 140.

The NAS 140 may also store a variety of different types of data organized in a variety of different ways and from a variety of different sources. For example, NAS 140 may include storage other than primary storage located within content-extraction system 130 that is directly accessible by processors located therein. NAS 140 may include secondary, tertiary, or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored. Examples of a non-transitory medium may include, for example, a magnetic disk or tape, optical storage media such as compact disk or digital versatile disk, flash memory, or memory devices.

The machine-learning query system 122 can receive a query from one or more of the client devices 110*a-c*. The query can include containing one or more search terms for one or more desired documents. A search term can include a keyword. The content-extraction system 130 from the machine-learning query system 122 can perform a search for digital content associated with an entity and identify a subset of digital documents that can be manually reviewed faster by the user.

For instance, the content-extraction system 130 can receive a request from one or more client device s 110*a-c* associated with a user for a subset of digital documents associated with an entity (e.g., a company or an individual). The content-extraction system 130 can remove certain documents, portions of digital documents, or both based on the content in the documents. The content-extraction system 130 can also discard digital document content that is a duplicate of other digital document content. The content-extraction system 130 can compute a score for each of the remaining digital documents based on a sentiment analysis of the remaining portions in each of the remaining digital documents. The content-extraction system 130 can identify a subset of digital documents based on the score for each digital document. The content-extraction system 130 can output the subset of digital documents to one or more client devices 110*a-c*. One or more of the client devices 110*a-c* can display the result set of digital content to the user.

In an illustrative example, the user can include a financial services provider (e.g., a bank) seeking to perform a due diligence check on an entity, which may be seeking a loan from the financial services provider. The user can be under regulations that require manual review of all documents received by the user as part of a due diligence check. The content-extraction system 130 can be used to identify a subset of digital documents that can be manually reviewed approximately 1200% faster and remove approximately 97% of the false positives.

For instance, the content-extraction system 130 can receive a request from a user to search for digital documents indicating adverse press coverage for an entity. The request can be a query including a set of keywords that the user has indicated as associated with adverse press coverage. In some aspects, the content-extraction system 130 can receive, via the communications network port 134, a request for adverse press coverage of an entity from a client device 110*a*. For example, the keywords can include criminal activities (e.g., money laundering or fraud) or objects (e.g., heroin or cocaine). In additional or alternative aspects, the content-extraction system 130 can receive a set of words from the client device 110*a* indicating preferences of the user for keywords to be used in searching for digital documents associated with the entity. The content-extraction system 130 can receive additional information on the entity from the entity data 142 stored in the NAS 140 and determine the keywords based on the information on the entity and the user preferences.

In some aspects, the content-extraction system 130 transmits the keywords to the digital content aggregator 160 and receives a set of digital documents based on the keywords from the digital content aggregator 160. For instance, the content-extraction system 130 can include (or be communicatively coupled to) a digital content aggregator 160 from a search system 136. The content-extraction system 130 can transmit, to the digital content aggregator 160, a request for a search of digital documents on a network (e.g., the internet) that include the keywords and information about the entity (e.g., a name or a name of a board member). The content-extraction system 130 can receive, from the digital content aggregator 160 and responsive to the request, a set of digital documents that include the keywords from the digital content aggregator.

The content-extraction system 130 can extract, from this set of digital documents, a reduced subset of the set of digital documents to provide to the user by excluding irrelevant content, duplicative content, etc. The set of digital documents can be stored in the digital dataset 144 in the NAS 140. The content-extraction system 130 can identify a subset of the set of digital documents to eliminate some of the digital documents stored and reviewed by one of the client device 110*a-c* associated with a user. In some aspects, the content-extraction system 130 removes non-core content from each digital document in the set of digital documents. Non-core content can include boilerplate or superfluous language present in a digital document. For example, a digital document can include a news article with boilerplate language such as links to other articles, citations, descriptions of the author, and advertisements. The content-extraction system 130 can search the remaining core content of each digital document for the keywords. Digital documents can be removed from the set of digital documents based on the number of keywords detected in the core content. Extracting a subset of the digital documents can also include checking the digital documents for duplicates.

In some aspects, extracting a subset of the digital documents can also include performing a sentiment analysis of the digital documents to determine content attributes about each digital document. The content-extraction system 130 can transmit the subset of digital documents to the client device 110*a*. In some aspects, the user can be seeking digital documents as part of a due diligence check of the entity. In additional or alternative examples, the user can be under an obligation to manually review digital content received by one of the client devices 110a-c. The subset of digital documents can consume less memory and be faster to review than the full set of digital documents received from the keyword search.

The content-extraction system 130 may include one or more other systems. For example, the content-extraction system 130 may include a database system for accessing the NAS 140, a communications grid, or both. A communications grid may be a grid-based content-extraction system for processing large amounts of data.

Each communication within the computing environment 100 (e.g., between client devices or between a server and a device) may occur over one or more data networks 120. Data networks 120 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the data network 120. The data network 120 can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

The number of devices and arrangement of devices depicted in FIG. 1 is provided for illustrative purposes. A different number of devices may be used. For illustrative purposes, FIG. 1 depicts the content-extraction system 130 and the search system 136 as different computing systems. But other implementations are possible. In some aspects, a single computing system can perform one or more of the operations described above with respect to the content-extraction system 130 and the search system 136.

Figure 2:
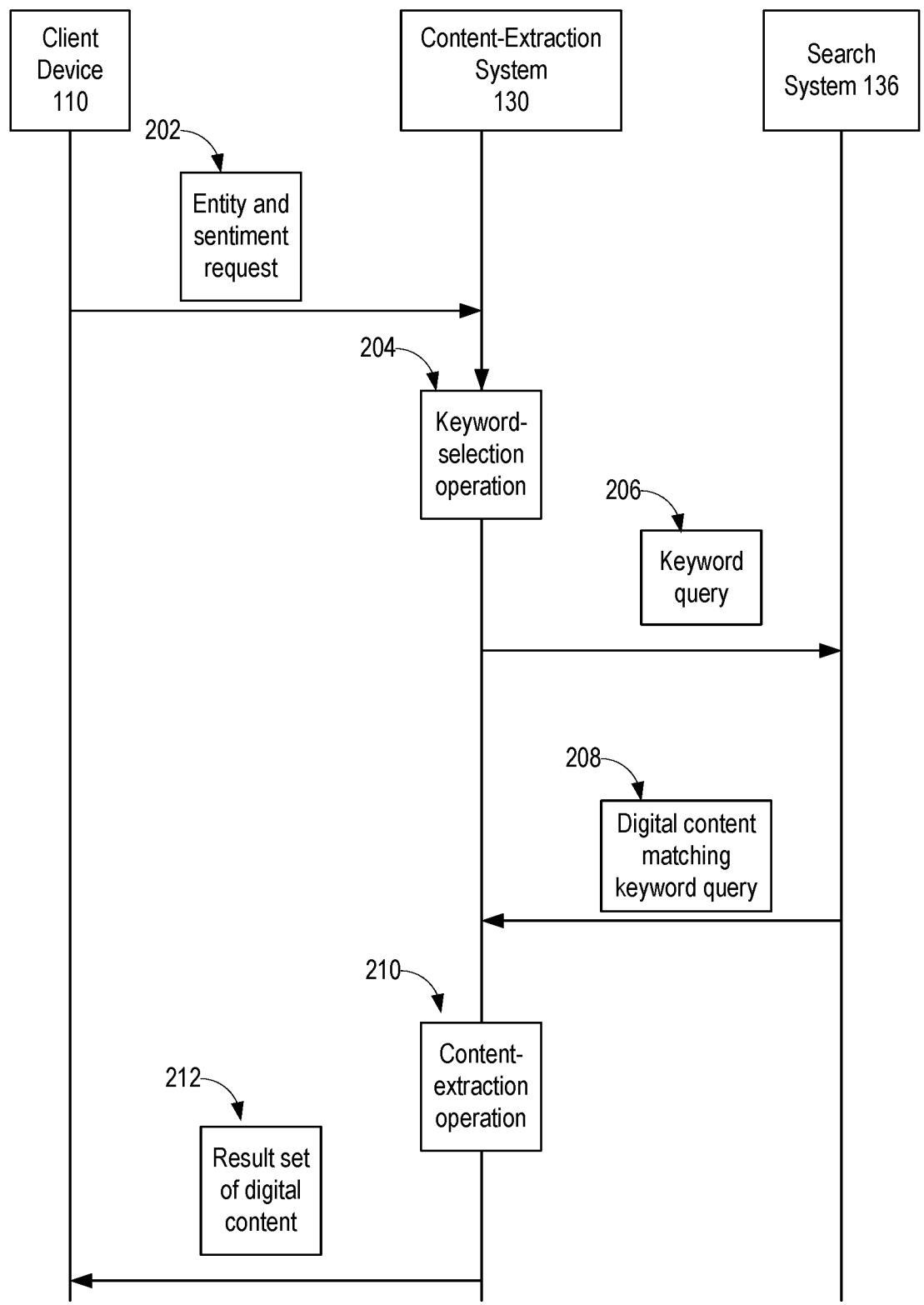
FIG. 2 depicts a sequence of interactions among different computing devices for identifying a subset of digital content items to be selected as a result set of digital content, according to some aspects of the present disclosure.

FIG. 2 is a sequence diagram depicting interactions among a client device 110, a content-extraction system 130, and a search system 136 for servicing a query. In this example, the client device 110 transmits a communication 202 to the content-extraction system 130. The communication 202 can be transmitted during a session between a client application, which is executed on the client device 110, and an interactive computing environment, which is executed on the content-extraction system 130 or a machine-learning query system 122. The communication 202 includes a request for digital content associated with a given entity and a sentiment for the digital content. The content-extraction system 130 can perform a keyword-selection operation 204 based on the request from the communication 202. The keyword-selection operation 204 can identify one or more keywords to be used in a keyword query to be directed to the search system 136.

The content-extraction system 130 can transmit a communication 206 to the search system 136. The communication 206 can include the keyword query. The search system 136 can respond with the communication 208. The communication 208 can include digital content matching the keyword query. The digital content can include a larger set of documents that match one or more of the keywords. The content-extraction system 130 can apply a content-extraction operation 210 to the digital content received in the communication 208. The content-extraction operation 210, an example of which is described herein with respect to FIG. 3, can extract a result set of digital content by, for example, performing one or more of core-content extraction, duplicate-content removal, and sentiment scoring. The content-extraction system 130 can transmit a communication 212 to the client device 110. The communication 212 can include result set of digital content, a link to result set of digital content, or some other communication providing access to the result set of digital content.

Figure 3:
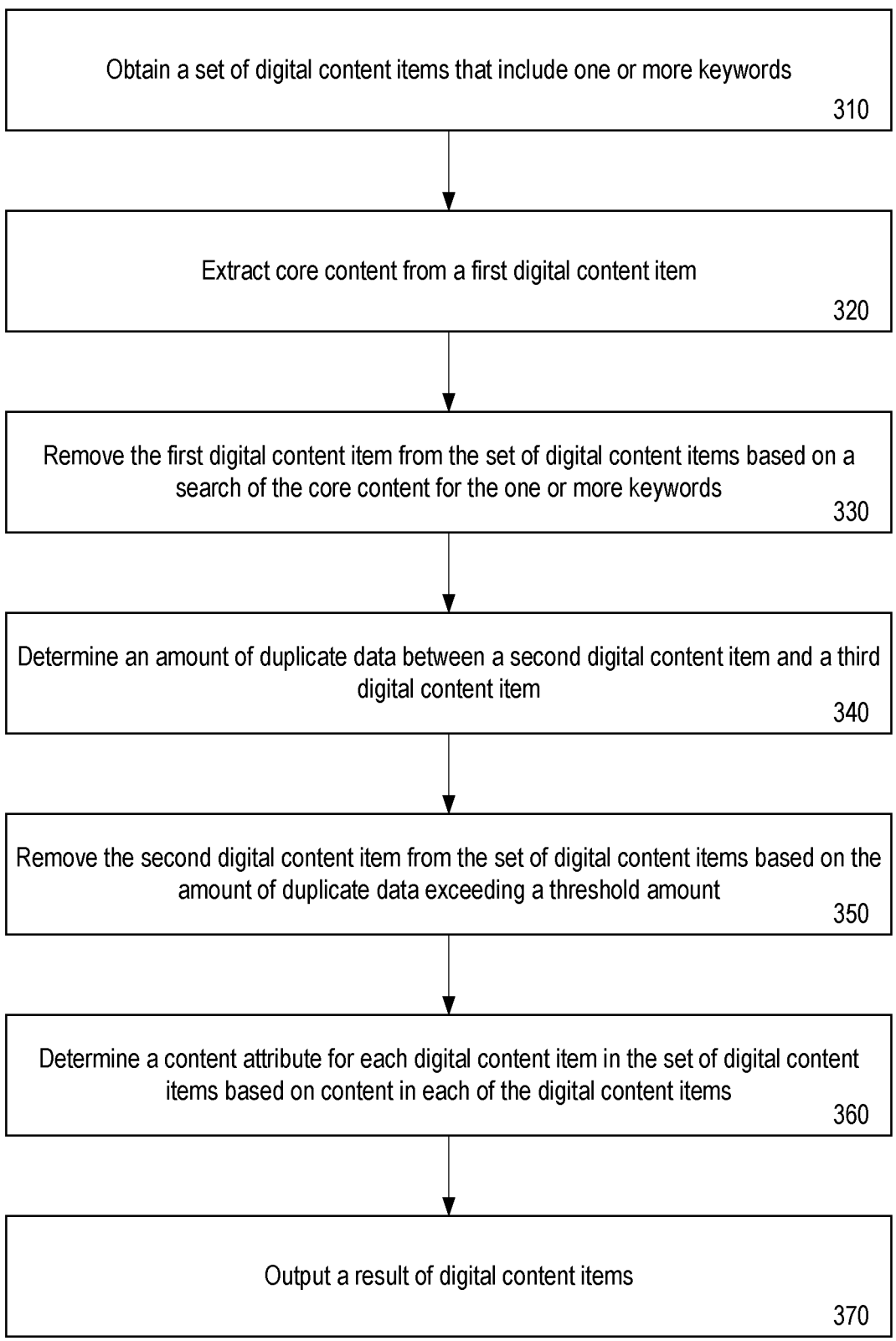
FIG. 3 depicts an example of a process for identifying a subset of digital content items to be selected as a result set of digital content, according to some aspects of the present disclosure.

FIG. 3 depicts an example of a process for identifying a subset of digital documents. The process is described below as being performed by the content-extraction system 130 in FIGS. 1 and -2, but other implementations are possible.

In block 310, the content-extraction system 130 receives a set of digital content items that each include one or more keywords. In some aspects, one or more processing devices of the content-extraction system 130 can receive the set of digital content items, such as digital documents, from a computing device associated with a user. In additional or alternative aspects, the content-extraction system 130 can request the set of digital content from a search system 136. For instance, the content-extraction system 130 can transmits a keyword query having one or more keywords to a digital content aggregator 160. The digital content aggregator 160 can search one or more data sources available via one or more networks for documents or other digital content items that include the keywords.

The set of digital content can include a variety of digital content items from a variety of sources. Each digital content item can include various content as well as the keywords. The keywords can include a name of an entity (e.g., a company), and predetermined terms with a negative connotation (e.g., money laundering, fraud, or criminal). In some aspects, the set of digital content can be received from the digital content aggregator 160 or other online data source.

The content-extraction system 130 can modify the received set of digital content by removing non-core content, duplicative content, or both. For instance, in block 320, the content-extraction system 130 extracts core content from a first digital content item of the set of digital content. The content-extraction system 130 can apply one or more classification machine-learning model to one or more digital content items. A classification machine-learning model can be trained to recognize, for example, a content portion, such as a main news article, within a larger digital content item, such as a webpage from an online news site. The content-extraction system 130 can identify core content based on core content classifications outputted by the classification machine-learning model. Examples of core content classification include probabilities or other values indicative of a particular content portion or content item belonging to a certain class of core content. The content-extraction system 130 can copy the core content and save the core content in a suitable memory structure for further analysis.

In some aspects, the content-extraction system 130 can extract the core content by removing boilerplate or other non-core content from each digital content item in the set of digital content. Boilerplate content can include advertisements, links, banners, and comments. The content-extraction system 130 can use a machine-learning algorithm to identify primary content from boilerplate content. For example, the machine-learning algorithm can be a supervised classification algorithm that uses features such as lexical features, text statistics, and relative position of text blocks to classify portions of a digital content item as primary content or boilerplate content.

In block 330, the content-extraction system 130 removes the first digital content item from the set of digital content based on a search of the core content for the keywords. In some aspects, the content-extraction system 130 removes the first digital content item based on an insufficient match between the core content and one or more keywords. For example, one or more processing devices in the content-extraction system 130 can search the core content of each digital content item in the set of digital content for the keywords. The content-extraction system 130 can compare the number of keywords found in the first digital content item with a threshold value. The processing devices can remove any digital content items from the set of digital content that do not contain the keywords in the core content or do not contain a threshold number of keywords in the core content. In one example, the content-extraction system 130 may determine that forty percent of the occurrences of keywords occur in boilerplate content or other non-core content.

In some aspects, the set of digital content can be stored as fields in a database. The processing devices can remove the first digital content item from the set of digital content by deleting the field from the database. The processing device can extract the core content by deleting the non-core content stored in each field. In additional or alternative aspects, the processing devices can select digital content items from the set of digital content and store the core content from the selected digital content items in a new database.

Removing digital content items that lack occurrences of the keywords in the core content from the set of digital content can reduce the number of digital content items in the set of digital content. Additionally or alternatively, extracting the core content from the digital content items can reduce the amount of content in each digital content item in the set of digital content. In some aspects, reducing the number of digital content items in the set of digital content can reduce the time and processing power used by a client device to perform other analysis of the set of digital content. In additional or alternative aspects, reducing the amount of content in the digital content items can reduce the time and processing power used by the content-extraction system 130 to perform other analysis of the set of digital content.

In block 340, the content-extraction system 130 determines an amount of duplicate data between a second digital content item and a third digital content item from the set of digital content. For example, one or more processing devices of the content-extraction system 130 can use machine learning to be trained to identify duplicate data. The content-extraction system 130 can retrieve the second digital content item and the third digital content item from a database storing the set of digital content. The content-extraction system 130 can tokenize each document. The content-extraction system 130 can perform a comparison of the tokenized versions of the second digital content item and the third digital content item. The content-extraction system 130 can determine, from the comparison, portions of the second digital content item that are included in the third digital content item. The content-extraction system 130 can determine a quantitative value (e.g., a number of sentences or words) indicating the amount of duplicate data in the second digital content item based on the comparison of the second digital content item with the third digital content item.

In some aspects, the amount of duplicate data can be a ratio of duplicate content (e.g., content that is the same in both digital content items) to the amount of content in the second digital content item. In some aspects, the content-extraction system 130 can determine the amount of duplicate data between each digital content item in the set of digital content in response to extracting the core content from the digital content items. For example, the processing devices in the content-extraction system 130 can compare the core content of a digital content item with the core content in other digital content items to determine an amount of duplicate data in the digital content item. Comparing the core content of two digital content items can be faster and use less processing power than comparing the original content of two digital content items.

In block 350, the content-extraction system 130 removes the second digital content item from the set of digital content based on the amount of duplicate data exceeding a threshold amount. Any digital content item can be removed in response to determining the digital content item is a duplicate of another document.

In some aspects, the content-extraction system 130 can determine that a digital content item is a duplicate based on the digital content item including an amount of duplicate data that exceeds a threshold amount. For example, one or more processing devices in the content-extraction system 130 can identify a digital content item that includes more than eighty-five percent duplicate data with another document as a duplicate document. The content-extraction system 130 can remove the duplicate document from the set of digital content.

In additional or alternative aspects, the content-extraction system 130 can identify a digital content item as a duplicate based on a threshold amount of the data in the digital content item being in one or more of the other digital content items. The content-extraction system 130 can store a number of the duplicate digital content items that were removed, which can be used to determine a prevalence of an opinion in the media. For example, the processing devices can determine that content that was duplicated by a variety of different news sources indicates a universally held opinion. In some aspects, the duplicate digital content items that were removed can be stored separately and provided to one or more of the client devices 110a-c. One or more of the client devices 110a-c can access the duplicate documents to determine another source of the duplicate data.

In an illustrative example, removing duplicates can remove thirty to forty percent of the digital content items in a set of digital content. Removing the duplicates from the set of digital content can thereby reduce the time and processing power used by the content-extraction system 130 to perform other analysis of the set of digital content. Removing the duplicates can also reduce the time required for manual review of the set of digital content.

In block 360, the content-extraction system 130 determines a content attribute for each digital content item in the set of digital content based on content in each of the digital content items. For instance, the content-extraction system 130 can include one or more processors that execute program code for implementing a content-attribute machine-learning model. The content-attribute machine-learning model can be trained to classify digital content as having a content attribute. The content attribute can be a quantitative or qualitative characteristic of the information in the content. The content attribute can be a number representing the number of times a keyword appears in the digital content item. In another example, the content attribute can be a ratio of the number of sentences that include the keyword to the total number of sentences. The content-extraction system 130 can determine the content attribute based on an analysis of the content (or core content) in the digital content item. In some aspects, the content-extraction system 130 can perform a pre-processing step of dividing each digital content item into sentences prior to determining the content attribute for each digital content item.

In additional or alternative aspects, the content-extraction system 130 can perform a sentiment analysis of portions of each digital content item. The sentiment analysis can determine grades for portions (e.g., phrases, sentences, paragraphs, or pages) of each digital content item. Examples of criteria for determining one or more content attributes include a number of negative sentences, a number of positive sentences, a ratio of positive sentences to negative sentences, a number of sentences that are negative that include a name associated with an entity, a number of sentences that are negative that include a keyword, etc.

In some aspects, the content-extraction system 130 can receive, from one or more client devices 110a-c, a respective weight for each type of content attribute. A weight can indicate a risk tolerance of the user for each type of content attribute. The content-extraction system 130 can determine a score for each digital content item based on the content attributes for each document and the weights for each of the content attributes. In some examples, the content attributes are quantitative. The content-extraction system 130 can determine a score by summing the results of multiplying the value of each content attribute by a value of the weight for the type of content attribute.

The content-extraction system 130 can remove digital content items from the set of digital content that have a score that exceeds a threshold value. In some aspects, the content-extraction system 130 can identify the threshold value based on one or more inputs received from one or more client devices 110a-c. The threshold value can, for example, be determined by the user based on a risk tolerance of the user. In additional or alternative aspects, the threshold value can be determined by the content-extraction system 130 based on the scores of the set of digital content. For example, the content-extraction system 130 can set the threshold value such that a predetermined ratio or a predetermined number of the digital content items exceed the threshold value.

In block 370, the content-extraction system 130 outputs a result set of the digital content items that has been selected from a larger set of digital content obtained at block 310. The result set can be the digital content items that remain after removing the first digital content item, the second digital content item, and the digital content items with certain sentiment or other content attribute scores (e.g., content items with positive sentiment scores that exceed a threshold value).

In some aspects, output operations can include providing one or more client devices 110a-c with access to the result subset of digital content generated by applying one or more machine-learning filters. For instance, a processing device of the machine-learning query system 122 could transmit suitable commands to a searchable document store, such as a data structure that stores a digital dataset 144 that a client device 110a is authorized to access via a data network 120. In additional or alternative aspects, these output operations can involve transmitting the result subset of digital content to one or more of the client devices 110a-c via a data network 120.

The result set can include fewer digital content items than the set of digital content received in block 310. The digital content items in the result set can also use a smaller amount of storage space as compared to the digital content items in the set of digital content received in block 310. For instance, the result set could be limited to core content items, while the set of digital content received in block 310 includes non-core content, duplicative content, or both. The subset of digital content can be transmitted to a client device for display to the user such that the user can manually review the subset of digital content. The subset of digital content can be transmitted faster and take up less storage than the set of digital content received in block 310. The subset of digital content can also be manually reviewed faster than the set of digital content received in block 310.

One or more of the client devices 110a-c can receive one or more transmissions from the machine-learning query system 122. A transmission can include the result set of digital content, provide a link to a network location of the result set of digital content, provide an update graphical interface for accessing the result set of digital content, or some combination thereof. For instance, if the client device executes a client application for accessing the machine-learning query system 122, the client application can present a graphical interface for accessing one or more content items in the result set of digital content. A particular digital content item can be selected via the interface for manual review. For instance, a digital content item having a value of the content attribute that exceeds a threshold value can be presented or selected via the graphical interface for manual review.

As described with respect to FIG. 3, some aspects involve the content-extraction system 130 identifying core content, duplicative content, content sentiment, or some combination thereof by applying one or more suitable machine-learning models to digital content received from the search system 136. An example of a machine-learning model for identifying core content, duplicative content, content sentiment, or some combination thereof can be a neural network model. For instance, a recursive neural tensor network can be applied to a digital document to identify or predict a document's sentiment.

A neural network can be represented as one or more hidden layers of interconnected nodes that can exchange data between one another. The layers may be considered hidden because they may not be directly observable in the normal functioning of the neural network. The neural network can be trained in any suitable manner. For instance, the connections between the nodes can have numeric weights that can be tuned based on experience. Such tuning can make neural networks adaptive and capable of "learning." Tuning the numeric weights can involve adjusting or modifying the numeric weights to increase the accuracy of classifying certain digital content as core content, classifying digital content as duplicative content, identifying a sentiment in a document, or some combination thereof. Additionally or alternatively, a neural network model can be trained by iteratively adjusting the number of nodes in the neural network, the number of hidden layers in the neural network, or other architectural feature of the neural network. Adjusting the number of nodes in the neural network can include adding or removing a node from a hidden layer in the neural network. Adjusting the number of hidden layers in the neural network can also include adding or removing a hidden layer in the neural network. In some aspects, training a neural network model for identifying core content, duplicative content, sentiment, or some combination thereof includes iteratively adjusting the structure of the neural network (e.g., the number of nodes in the neural network, number of layers in the neural network, connections between layers, etc.) such that a tag or other label assigned to training document by the neural network matches a user-specified tag or other label.

In an example involving core content attributes, certain training documents can be labeled as having one or more core content attributes. A core-content-classification neural network can be applied to document content from the training documents. If the core-content-classification neural network fails to identify the document content as having the core content attributes (or fails to output a threshold probability of the document content as having the core content attributes), the core-content-classification neural network can be adjusted. If the core-content-classification neural network correctly identifies the document content as having the core content attributes (or outputs a threshold probability of the document content as having the core content attributes), the core-content-classification neural network can be outputted for use by the content-extraction engine 132.

In an example involving duplicative content, a certain set of training documents can be labeled as having duplicative content with respect to one another. A duplicative-content-identification neural network can be applied to document content from the training documents. If the duplicative-content-identification neural network fails to identify a first training document as having duplicative document content with respect to a second training document (or fails to output a threshold probability of the duplicative content being present), the duplicative-content-identification neural network can be adjusted. If the duplicative-content-identification neural network correctly identifies the duplicative content, the duplicative-content-identification neural network can be outputted for use by the content-extraction engine 132.

Figure 4:
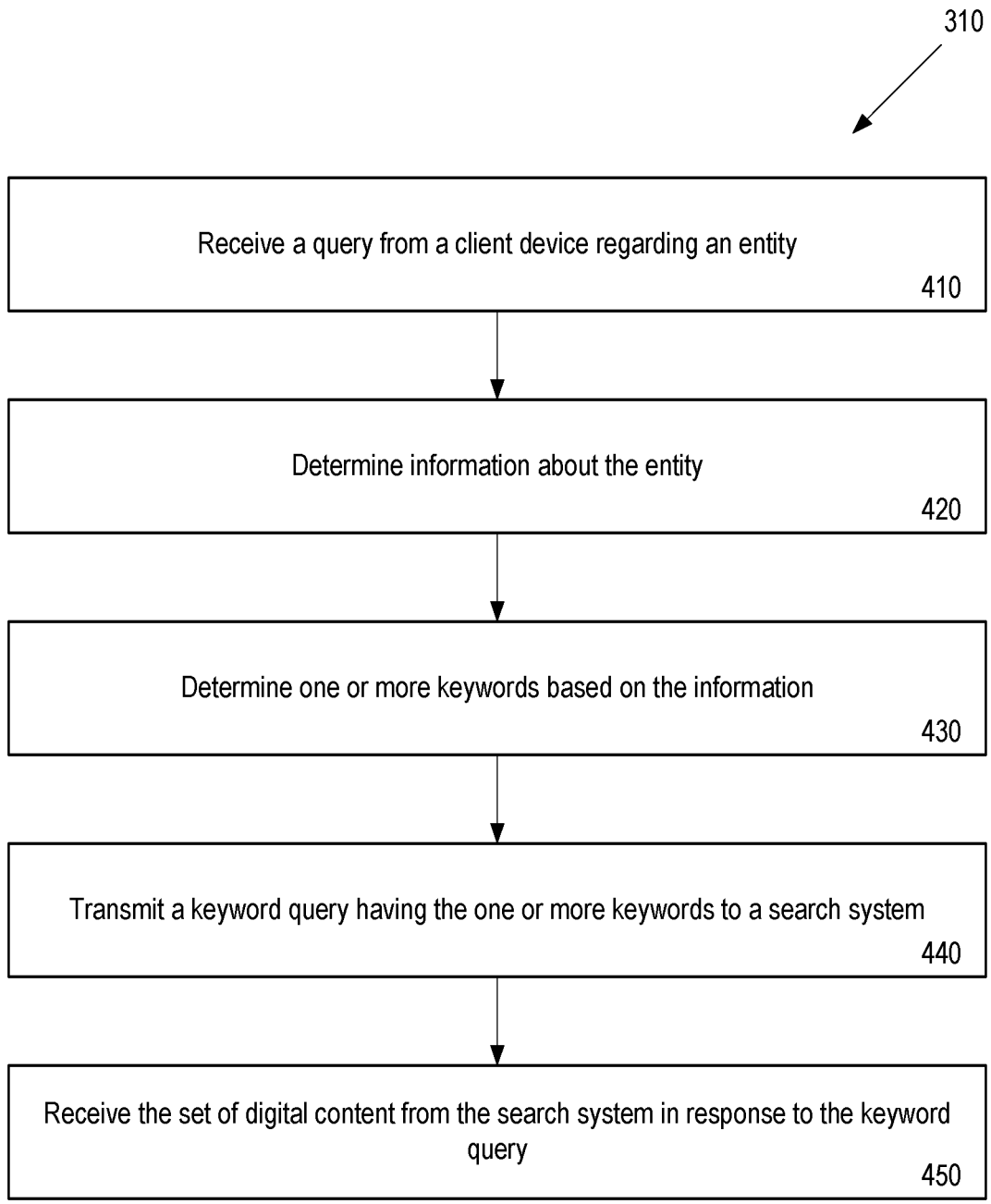
FIG. 4 depicts an example of a process for servicing a query for digital content, according to some aspects of the present disclosure.

The set of digital documents received in block 310 can be obtained in various ways by the content-extraction system 130. In some aspects, the set of digital documents can be received from a computing device associated with a user. In additional or alternative aspects, the set of digital documents can be obtained by the digital content aggregator 160. FIG. 4 is a flow chart of an example of a process for obtaining a set of digital content from a search system based on a query from a client device. In some aspects, the process depicted in FIG. 4 can be used to implement block 310 of the process depicted in FIG. 3. The process is described below as performed by a content-extraction system 130. But other implementations are possible.

In block 410, the content-extraction system 130 receives a query from a client device regarding an entity. For instance, the query from the client device can include a request for digital content associated with an entity and having an adverse sentiment or other negative sentiment (e.g., adverse news stories). In an illustrative example, a computing device associated with a user can use the machine-learning query system 122 to search of adverse press coverage associated with the entity as part of a vetting process to determine a risk associated with providing a loan to the entity or to comply with governmental or industry regulations to perform a due diligence check on certain entities.

In some aspects, the query or other request received from one or more client devices 110*a*-*c* can include a name of the entity and other information about the entity. In additional or alternative aspects, the query or other request can include a set of keywords to be used for searching for digital content at a search system 136. In additional or alternative aspects, the query or other request can include one or more user preferences regarding content attributes to be used for extracting a result set of digital content. For example, a request can indicate that digital documents linking the entity to money laundering should always be provided to the user.

In block 420, the content-extraction system 130 determines information about the entity. For example, the NAS 140 could include one or more databases or other data structures that store data about an entity. The data could be stored from previous interaction with the entity. The content-extraction system 130 can query the databases or other data structures, such as the entity data 142, for information associated with the entity. The information could include, for example, the names of certain individuals that are identified in the databases or other data structures as being linked to the entity (e.g., board members or other key decision-makers listed in records for a corporate entity).

In block 430, the content-extraction system 130 determines the keywords based on the information. The information can include locations, subsidiaries, and products associated with the entity. The content-extraction system 130 can determine the keywords to include words with a relationship to the entity. In some aspects, the content-extraction system can also receive a set of terms from the client device. The content-extraction system 130 can analyze the set of term from the client device and determine additional keywords related to the set of keywords received from the user.

In additional or alternative aspects, the content-extraction system 130 can determine the keywords based on the information determined about the entity and a set of predetermined words associated with adverse sentiments. For example, the content-extraction system 130 can determine the names and professional history of members of the board for the entity. The content-extraction system 130 can determine the keywords to include names of other entities associated with the professional history of a board member, time periods the board member was associated with the other entity, and predetermined words such as bankruptcy, fraud, money laundering, and embezzlement. In some aspects, the information determined about the entity includes a business field (e.g., pharmaceuticals, finance, or construction) associated with the entity and the set of predetermined words are associated with the business field. For example, the set of predetermined words for an automotive entity may include recall, death, and cover-up. In some aspects, the keywords can include a date of birth or an age of an entity. Comparing the date of birth or age of an entity with dates included in digital documents can be used to indicate a digital document is not related to the entity.

In block 440, the content-extraction system 130 transmits a keyword query having one or more of the determined keywords to a search system 136. The content-extraction system 130 can transmit the keywords to a digital content aggregator 160 or an online service (e.g., a search engine) executed at the search system 136. The content-extraction system 130 can request that the search system 136 performs a search using the keywords for adverse press coverage.

The search system 136 can access one or more data stores, such as a database or other data structure storing crawled web pages or other documents, to compare the search terms to searchable fields from the data store. The search system 136 can retrieve, from the data store, web pages or other documents that match the search terms. The search system 136 can provide the content-extraction engine 132 with access to the retrieved web pages or other documents by, for example, transmitting copies of the retrieved web pages or other documents, links to the retrieved web pages or other documents, or some combination thereof.

In block 450, the content-extraction system 130 receives the digital content items from the search system 136. The digital content items (e.g., documents) can each include a threshold number of the keywords or otherwise match one or more of the keywords included in a keyword query. The content-extraction system 130 can store the digital content items in memory as the digital dataset 144. The content-extraction system can identify a subset of the digital content items by, for example, performing the process depicted in FIG. 3.

Figure 5:
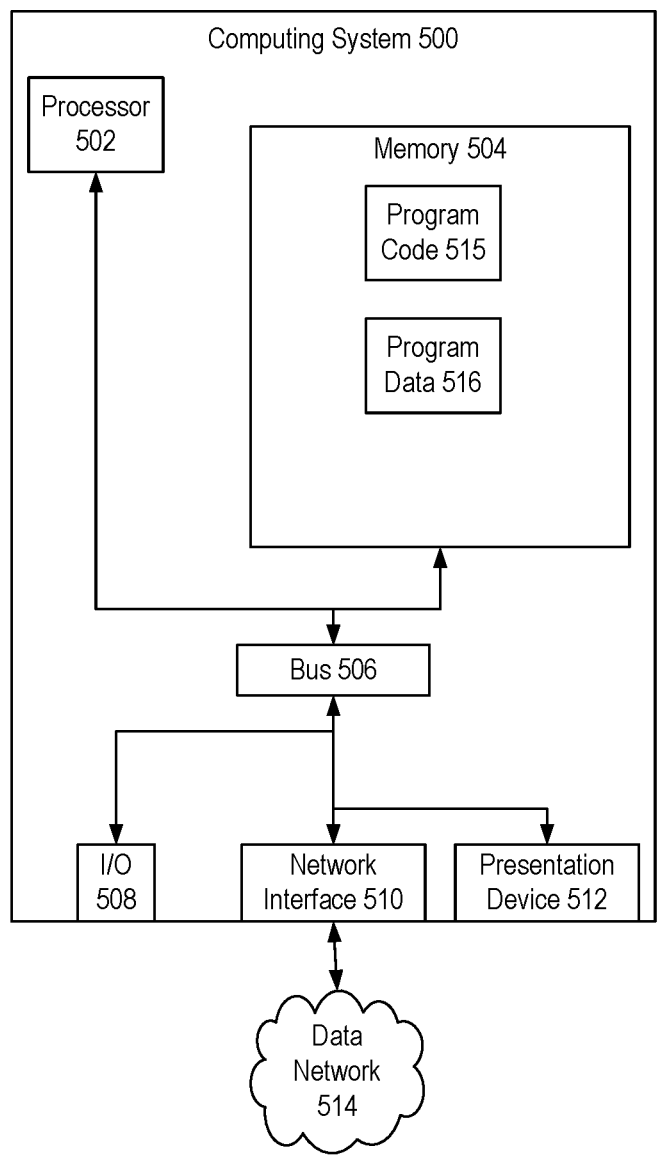
FIG. 5 depicts an example of a computing system for performing one or more operations described herein, according to some aspects of the present disclosure.

Any suitable computing system or group of computing systems can be used for performing the operations described herein. For example, FIG. 5 depicts an example of a computing system 500. In some aspects, the computing system 500 having devices similar to those depicted in FIG. 5 (e.g., a processor, a memory, etc.) could be used to separately implement one or more of a machine-learning query system 122, a content-extraction system 130, a search system 136, and a client device 110. In additional or alternative aspects embodiments, a single computing system 500 combines the one or more operations and data stores depicted as separate systems in FIG. 1.

The depicted example of a computing system 500 includes a processor 502 communicatively coupled to one or more memory devices 504. The processor 502 executes computer-executable program code stored in a memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including a single processing device.

The memory device 504 includes any suitable non-transitory computer-readable medium for storing program code 515, program data 516, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 500 may also include a number of external or internal devices, such as input or output devices. For example, the computing system 500 is shown with one or more input/output ("I/O") interfaces 508. An I/O interface 508 can receive input from input devices or provide output to output devices, such as a presentation device 512. One or more buses 506 are also included in the computing system 500. The bus 506 communicatively couples one or more components of a respective one of the computing system 500.

The computing system 500 executes program code 515 that configures the processor 502 to perform one or more of the operations described herein. Examples of the program code 515 include, in various embodiments, the content-extraction engine 132, the digital content aggregator 160, a client application executed on a client device 110, or other suitable applications that perform one or more operations described herein. The program code 515 may be resident in the memory device 504 or any suitable computer-readable medium and may be executed by the processor 502 or any other suitable processor.

The computing system 500 can access program data 516 (e.g., digital content obtained from a keyword query, a result set of digital content, a digital dataset 144, etc.) in any suitable manner. In some embodiments, one or more of these data sets, models, and functions are stored in the same memory device (e.g., one of the memory devices 504). In additional or alternative embodiments, one or more of the programs, data sets, models, and functions described herein are stored in different memory devices 504 accessible via a data network.

The computing system 500 also includes a network interface device 510. The network interface device 510 includes any device or group of devices (e.g., a communications network port 134) suitable for establishing a wired or wireless data connection to one or more data networks 514, via which communications with a client device 110 can occur. Non-limiting examples of the network interface device 510 include an Ethernet network adapter, a modem, etc. The computing system 500 is able to communicate with one or more other computing devices (e.g., a client device 110 executing a client application) via a data network 514 using the network interface device 510. Examples of the data network 514 include, but are not limited to, the internet, a local area network, a wireless area network, a wired area network, a wide area network, and the like.

In some embodiments, the computing system 500 also includes the presentation device 512 depicted in FIG. 5. A presentation device 512 can include any device or group of devices suitable for providing visual, auditory, or other suitable sensory output. Non-limiting examples of the presentation device 512 include a touchscreen, a monitor, a speaker, a separate mobile computing device, etc. In some aspects, the presentation device 512 can include a remote client device 110 that communicates with the computing system 500, such as the machine-learning query system 112, using one or more data networks described herein. Other aspects can omit the presentation device 512.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, throughout this specification terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A computing system comprising:
   a client device configured to transmit a search query regarding an entity to a query system;
   a search computing device configured to:
   search a digital dataset based on keywords to determine a set of digital content, each digital content item in the set of digital content including one or more keywords identified from the search query, and
   transmit the set of digital content to the query system; and
   the query system communicatively coupled, via a data network, to the client device and the search computing device, the query system positioned remotely from the client device and between the client device and the search computing device, the query system comprising:
   a non-transitory computer-readable medium storing program code; and
   one or more processing devices communicatively coupled to the non-transitory computer-readable medium, the one or more processing devices configured to execute the program code to perform operations comprising:
      receiving, from the client device, the query regarding the entity, wherein the query includes a request for documents with a certain sentiment regarding the entity,
      creating a result set of digital content from the set of digital content, wherein creating the result set of digital content comprises:
         obtaining, from the search computing device, the set of digital content,
         generating, based on one or more machine-learning models, a reduced set of digital content by removing non-core content and duplicates from the set of digital content,
         executing a content-attribute machine-learning model for each digital content item in the reduced set of digital content to determine a sentiment score based on a respective portion of each digital content item in the set of digital content, and
         selecting, as the result set of digital content, a subset of digital content from the set of digital content, wherein the subset of digital content is selected based on the sentiment score determined for each digital content item in the set of digital content being above a threshold value associated with the certain sentiment, and
      transmitting, to the client device, a message configured for providing the client device with access to the result set of digital content.

2. The computing system of claim 1, wherein obtaining the set of digital content comprises:
   obtaining, from the query, a name of the entity;
   matching the name of the entity to names of individuals associated with the entity;
   identifying a user preference specified via input from the client device;
   determining the one or more keywords based on the name of the entity, the names of individuals associated with the entity, and the user preference;
   transmitting, to the search computing device, a keyword query having the one or more keywords; and
   receiving the set of digital content from the search computing device that match the one or more keywords.

3. The computing system of claim 1, wherein executing the content-attribute machine-learning model for each digital content item comprises:
   performing a sentiment analysis on a portion of each digital content item to determine a sentiment of the portion; and
   determining, for each digital content item in the set of digital content, the sentiment score based on the sentiment of the portion and a location of the one or more keywords in the digital content item.

4. The computing system of claim 1, wherein the one or more machine-learning models comprise a classification machine-learning model and wherein generating the reduced set of digital content further comprises:
   executing the classification machine learning model for the set of digital content to extract core content from each digital content item in the set of digital content, wherein the classification machine learning model comprises a neural network model that comprises one or more hidden layers of interconnected nodes and is configured to identify core content from the digital content item using features comprising one or more of lexical features, text statistics, or relative position of text blocks; and
   removing, from the set of digital content, content identified as non-core content.

5. The computing system of claim 4, wherein extracting the core content from each digital content item comprises:
   applying a machine-learning model to each digital content item that identifies the core content and non-core content in each digital content item; and
   removing, from each digital content item, the non-core content.

6. The computing system of claim 4, wherein determining the sentiment score comprises applying the content-attribute machine-learning model to the core content of each digital content item of the set of digital content.

7. The computing system of claim 1, wherein generating the reduced set of digital content comprises:
tokenizing (i) a first digital content item in the set of digital content and (ii) a second digital content item in the set of digital content,
determining an amount of duplicate data between the tokenized first digital content item in the set of digital content and the tokenized second digital content item in the set of digital content, and
modifying the set of digital content by removing the first digital content item from the set of digital content based on the amount of duplicate data exceeding a threshold amount.

8. A method comprising:
receiving, by a content-extraction system and from a client device, a query regarding an entity, the content-extraction system positioned remotely from the client device and between the client device and a search computing device that is configured to search a digital dataset based on keywords, wherein the query includes a request for documents with a certain sentiment regarding the entity;
creating, by the content-extraction system, a result set of digital content responsive to the query, wherein creating the result set of digital content comprises:
obtaining, from the search computing device, a set of digital content, each digital content item in the set of digital content including one or more keywords identified from the query,
generating, based on one or more machine-learning models, a reduced set of digital content by removing non-core content and duplicates from the set of digital content,
executing, a content-attribute machine-learning model for each digital content item in the reduced set of digital content to determine a sentiment score based on a respective portion of each digital content item in the reduced set of digital content, and
selecting, as the result set of digital content, a subset of digital content from the reduced set of digital content, wherein the subset of digital content is selected based on the sentiment score determined for each digital content item in the reduced set of digital content; and
transmitting, by the content-extraction system, the result set of digital content to the client device.

9. The method of claim 8, wherein obtaining the set of digital content comprises:
obtaining, from the query, a name of the entity;
matching the name of the entity to names of individuals associated with the entity;
identifying a user preference specified via input received by the content-extraction system from the client device;
determining the one or more keywords based on the name of the entity, the names of individuals associated with the entity, and the user preference;
transmitting, to the search computing device, a keyword query having the one or more keywords; and
receiving the set of digital content from the search computing device that match the one or more keywords.

10. The method of claim 8, wherein executing the content-attribute machine-learning model for each digital content item comprises:
performing a sentiment analysis on a portion of each digital content item to determine a sentiment of the portion; and
determining, for each digital content item in the set of digital content, a sentiment score based on the sentiment of the portion and a location of the one or more keywords in the digital content item.

11. The method of claim 8, wherein the one or more machine-learning models comprises a classification machine learning model and wherein generating the reduced set of digital content comprises:
executing the classification machine-learning model for the set of digital content to extract core content from each digital content item in the set of digital content, wherein the classification machine-learning model comprises a neural network model that comprises one or more hidden layers of interconnected nodes and is configured to identify core content from the digital content item using features comprising one or more of lexical features, text statistics, or relative position of text blocks; and
removing, from the set of digital content, content identified as non-core content.

12. The method of claim 11, wherein extracting the core content from each digital content item comprises:
applying a machine-learning model to each digital content item that identifies the core content and non-core content in each digital content item; and
removing, from each digital content item, the non-core content.

13. The method of claim 11, wherein determining the sentiment score comprises applying the content-attribute machine-learning model to the core content of each digital content item of the set of digital content.

14. The method of claim 8, wherein generating the reduced set of digital content comprises:
tokenizing (i) a first digital content item in the set of digital content and (ii) a second digital content item in the set of digital content,
determining an amount of duplicate data between the tokenized first digital content item in the set of digital content and the tokenized second digital content item in the set of digital content, and
modifying the set of digital content by removing the first digital content item from the set of digital content based on the amount of duplicate data exceeding a threshold amount.

15. A non-transitory computer-readable medium having program code stored thereon, wherein the program code, when executed by one or more processing devices of a filtering system, configures the filtering system to perform operations comprising:
receiving, from a client device, a query regarding an entity, wherein the filtering system positioned remotely from the client device and between the client device and a search computing device that is configured to search a digital dataset based on keywords and wherein the query includes a request for documents with a certain sentiment regarding the entity;
creating a result set of digital content responsive to the query, wherein creating the result set of digital content comprises:
obtaining, from the search computing device, a set of digital content, each digital content item in the set of digital content including one or more keywords identified from the query, generating, based on one or more machine-learning models, a reduced set of digital content by removing non-core content and duplicates from the set of digital content, executing a content-attribute machine-learning model for each digital content item in the reduced set of digital content to determine a sentiment score based on a respective portion of each digital content item in the reduced set of digital content, and selecting, as the result set of digital content, a subset of digital content from the reduced set of digital content, wherein the subset of digital content is selected based on the sentiment score determined for each digital content item in the reduced set of digital content; and transmitting to the client device the result set of digital content.

16. The non-transitory computer-readable medium of claim 15, wherein obtaining the set of digital content comprises:

obtaining, from the query, a name of the entity;

matching the name of the entity to names of individuals associated with the entity;

identifying a user preference specified via input received from the client device;

determining the one or more keywords based on the name of the entity, the names of individuals associated with the entity, and the user preference;

transmitting, to the search computing device, a keyword query having the one or more keywords; and receiving the set of digital content from the search computing device that match the one or more keywords.

17. The non-transitory computer-readable medium of claim 15, wherein executing the content-attribute machine-learning model for each digital content item comprises:

performing a sentiment analysis on a portion of each digital content item to determine a sentiment of the portion; and determining, for each digital content item in the set of digital content, a respective value of the sentiment score based on the sentiment of the portion and a location of the one or more keywords in the digital content item.

18. The non-transitory computer-readable medium of claim 15, wherein the one or more machine-learning models comprises a classification machine-learning model and wherein generating the reduced set of digital content comprises:

executing the classification machine-learning model for the set of digital content to extract core content from each digital content item in the set of digital content, wherein the classification machine-learning model comprises a neural network model that comprises one or more hidden layers of interconnected nodes and is configured to identify core content from the digital content item using features comprising one or more of lexical features, text statistics, or relative position of text blocks; and removing, from the set of digital content, content identified as non-core content.

19. The non-transitory computer-readable medium of claim 18, wherein extracting the core content from each digital content item comprises:

applying a machine-learning model to each digital content item that identifies the core content and non-core content in each digital content item; and removing, from each digital content item, the non-core content.

20. The non-transitory computer-readable medium of claim 18, wherein determining the sentiment score comprises applying the content-attribute machine-learning model to the core content of each digital content item of the set of digital content.

* * * * *